United States Patent [19]
Burns et al.

[11] Patent Number: 5,920,429
[45] Date of Patent: *Jul. 6, 1999

[54] FLUORESCENT DYE BLENDS

[75] Inventors: David M. Burns, Woodbury; David B. Olson, May Township; Lee A. Pavelka, Cottage Grove, all of Minn.

[73] Assignee: Minnesota Mining and Manufacturing Company, St. Paul, Minn.

[ * ] Notice: This patent is subject to a terminal disclaimer.

[21] Appl. No.: 08/939,065

[22] Filed: Sep. 29, 1997

Related U.S. Application Data

[63] Continuation-in-part of application No. 08/536,442, Sep. 29, 1995, Pat. No. 5,672,643, and application No. 08/536,572, Sep. 29, 1995, Pat. No. 5,674,622.

[51] Int. Cl.[6] .......................... G02B 5/12; C08K 5/5437
[52] U.S. Cl. .................. 359/515; 359/359; 359/529; 359/589; 428/412; 428/421; 428/480; 428/500; 524/90
[58] Field of Search .................. 359/359, 515, 359/589; 428/412; 524/90

[56] References Cited

U.S. PATENT DOCUMENTS

| | | | |
|---|---|---|---|
| 4,039,467 | 8/1977 | Tucker | 252/587 |
| 4,443,226 | 4/1984 | Rohser | 8/532 |
| 5,104,918 | 4/1992 | Babler | 524/90 |
| 5,200,851 | 4/1993 | Coderre et al. | 359/351 |
| 5,272,562 | 12/1993 | Coderre | 359/529 |
| 5,387,458 | 2/1995 | Pavelka et al. | 428/141 |
| 5,672,643 | 9/1997 | Burns et al. | 524/90 |
| 5,674,622 | 10/1997 | Burns et al. | 428/412 |
| 5,754,337 | 5/1998 | Burns et al. | 359/515 |

FOREIGN PATENT DOCUMENTS

| | | |
|---|---|---|
| 041 274 B1 | 6/1981 | European Pat. Off. . |
| 2 359 175 | 2/1978 | France . |
| WO A 9617012 | 6/1996 | WIPO . |

OTHER PUBLICATIONS

Christie, Robert M., "Fluorescent Dyes," Dept. of Textiles, Scottish College of Textiles, Netherdale, Galashiels, TD13HF, UK, Rev. Prog. Coloration, vol. 23, pp. 1–18 (1993).

Simon, Frederick T., et al., "Match Prediction of Highly Fluorescent Colors," *COLOR Research and Application*, vol. 19, No. 6, pp. 461–474 (Dec. 1994).

Billmeyer, Fred W. Jr., et al., "Energy Transfer between Fluorescent Organic Pigments," *COLOR Research and Application*, vol. 8, No. 1, Dept. of Chemistry, Rensselaer Polytechnic Institute, Troy, New York, pp. 12–16 (Spring 1983).

Patent Abstracts of Japan, vol. 018, No. 271 (C–1203), May 24, 1994 and JP A 06 046685, Feb. 22, 1994.

Patent Abstracts of Japan, vol. 009, No. 200 (C–298), Aug. 16, 1985 and JP A 60 067545, Apr. 17, 1985.

*Primary Examiner*—Tae Yoon
*Attorney, Agent, or Firm*—Robert H. Jordan

[57] ABSTRACT

A fluorescent yellow article containing a blend of an N,N'-disubstituted 3,4:9,10-perylenebis(dicarboximide) dye and a fluorescent yellow-green dye soluble in a polymeric matrix and meeting the chromaticity requirements of CIE and ASTM and having a fluorescence luminance factor of greater than 5, as well as a method of preparing such articles is described. Also described is a fluorescent retroreflective article containing a color layer having first and second sides, wherein the article includes retroreflective elements on one side of the color layer or a retroreflective base sheet disposed on one side of the color layer, where the color layer includes the above-mentioned fluorescent yellow article.

9 Claims, 2 Drawing Sheets

FLUORESCENT DYE BLENDS

CROSS-REFERENCE TO RELATED APPLICATIONS

This application is a continuation-in-part of application Ser. Nos. 08/536,442 and 08/536,572, both filed on Sep. 29, 1995 and now U.S. Pat. Nos. 5,672,643 and 5,674,622.

FIELD OF THE INVENTION

The invention relates to fluorescent coloring. Specifically, the invention relates to providing fluorescent yellow articles.

BACKGROUND OF THE INVENTION

It is commonly known that fluorescent colors provide increased visibility for visual signaling under most lighting conditions, but particularly under low natural lighting conditions. These low natural lighting conditions occur at dusk and also at sunrise and present a challenge for traffic sign manufacturers. If increased visibility of an article is desired, the article is often colored with fluorescent colorants. Fluorescent colors allow enhanced visibility because the visual contrast that the fluorescent colors create with the environment make the materials more conspicuous than ordinary non-fluorescent articles. Fluorescent colored traffic signs are effective at increasing the visibility of the signs which increases motorist safety.

Even though fluorescent signs increase motorist safety, their use for yellow signs has been limited due to the difficulty to obtain a true fluorescent yellow. To date, fluorescent colorants are available in only a limited range of hues. For example, fluorescent colorants are commercially available and include fluorescent red, fluorescent orange and fluorescent yellow-green. However, a true fluorescent yellow which meets the chromaticity requirements of Commission Internationale de l'eclairage (CIE) and ASTM is not readily available. As is known in the art the CIE provides international recommendations for surface colors for visual signaling.

Formulating colors using ordinary or conventional colorants is well known. Ordinary colors do not emit light. Therefore, when formulating colors with ordinary colorants, the important parameters to consider are the light-absorptive and light-reflective properties of the colorants. On the other hand, fluorescent colors do emit light. Therefore, when formulating with fluorescent colorants, the important parameters to consider are the light-absorptive, light-reflective and light-emissive properties of the fluorescent colorants. Due to this distinction between ordinary and fluorescent colors, an added consideration is necessary when formulating colors with fluorescent dyes.

The art of formulating colors from ordinary colorants is well-developed. For example, it is known that a mixture of blue colorant with a red colorant will give a purple color. However, the art of formulating colors from fluorescent colorants is not well-defined. U.S. Pat. No. 4,443,226 issued to Rohser describes combining thioindigo and/or derivatives of the red and pink series of thioindigo with specific yellow disperse dyestuffs to obtain a shade of fluorescent orange-red as required to meet color point, luminance and fastness to light.

The need exists for fluorescent yellow articles such as those useful for visual signaling, for example, traffic signing. The art does not currently possess such fluorescent yellow articles nor an obvious way to achieve them.

SUMMARY OF THE INVENTION

The visibility of an object is a function of the visual contrast between the object and the background, or surroundings, against which it is viewed. Research indicates that both luminance contrast and color contrast determine the visibility of objects in the environment, for example traffic signs on the roadway. The terms "visibility" and "conspicuity" are often, and incorrectly, used interchangeably in general usage. Technically, "visibility" refers to an object's threshold of detection. It is most often defined in terms of the distance at which the object can just be differentiated with certainty from its surroundings by an observer actively searching for the object. The term "conspicuity" refers to the ease with which an object is discovered. A conspicuous object has the apparent capacity to attract an observer's attention—even when they are not actively searching for nor expecting the object to appear. Conspicuity is a function of the magnitude of the contrast between the object and the background. Objects become more conspicuous, more prominent in the visual field, as their contrast to the surroundings increases. In general, an object's visibility, and conspicuity, increases as its luminance and saturation (color intensity) is increased relative to the surroundings. In complex visual environments, "visibility" and "conspicuity" represent a hierarchy of visual perception. It is possible for an object to be visible, yet not conspicuous. However, it is impossible for a conspicuous object to be anything other than highly visible.

Numerous studies have demonstrated that the basis for the superior daytime visibility performance of fluorescent signal colors is their high luminance relative to the surroundings. The luminance of an ordinary colored material is determined by the efficiency with which the material reflects incident daylight. However, the luminance of a fluorescent specimen is the sum of two quantities—the luminance due to reflected light and the luminance due to fluorescence (re-emitted light). Fluorescent luminance plays the central role in the high visibility properties of fluorescent materials used for visual signaling. One can consider fluorescence to be a mechanism that increases the efficiency of a colored material to convert the available solar energy into luminance. An important property of fluorescent materials from the visual signaling point of view is that their greatest relative luminance (highest luminance contrast), and thus greatest visibility and conspicuity performance, occurs under poor daytime visibility conditions when the need is greatest, for example, during twilight or rainy and overcast conditions. For safety signing applications, such as highway warning signs, high visibility under poor visibility conditions is extremely desirable.

The invention provides fluorescent articles which have a yellow color with chromaticity coordinates within the CIE and ASTM requirements and with the required fluorescent luminance for visual signaling. Each article is comprised of a polymeric matrix and a blend of at least two different dyes selected specifically for the polymeric matrix which is used in the article. Also provided are fluorescent yellow retroreflective sheeting and methods of manufacturing such sheeting.

Accordingly, the present invention in its first aspect is a fluorescent yellow article including a polymeric matrix; an N,N'-disubstituted 3,4:9,10-perylenebis(dicarboximide) dye; and a fluorescent yellow-green dye, the dyes being soluble in the polymeric matrix, and the article having chromaticity coordinates (x,y) within the area defined by (0.425,0.480), (0.465,0.535), (0.557,0.440) and (0.500, 0.410) in terms of the CIE 1931 Standard Colorimetric System and measured using 0/45 illumination/viewing geometry (or equivalent 45/0) and evaluated with CIE Standard Illuminant D65 and a fluorescence luminance factor of greater than 5.

A second aspect of the present invention is a fluorescent retroreflective article which includes a color layer having first and second sides, the article comprising retroreflective elements on one side of the color layer or a retroreflective base sheet disposed on one side of the color layer and including the above-defined fluorescent yellow article.

A third aspect of the present invention is a method of manufacturing a fluorescent yellow article which includes the steps of blending an N,N'-disubstituted 3,4:9,10-perylenebis(dicarboximide) dye and a fluorescent yellow-green dye in a polymeric matrix to form a solid solution; and extruding the solution to form a film, which film includes a fluorescent yellow article containing a polymeric matrix; an N,N'-disubstituted 3,4:9,10-perylenebis(dicarboximide) dye; and a fluorescent yellow-green dye, wherein the dyes are soluble in the polymeric matrix, and the article has chromaticity coordinates (x,y) within the area defined by (0.425,0.480), (0.465,0.535), (0.557,0.440) and (0.500, 0.410) in terms of the CIE 1931 Standard Colorimetric System and measured using 0/45 geometry and evaluated with CIE Standard Illuminant D65 and a fluorescence luminance factor of greater than 5.

BRIEF DESCRIPTION OF THE DRAWINGS

The invention is further explained with reference to the drawings, wherein.

DETAILED DESCRIPTION

Definitions

As referred to herein, the term "colorant" shall mean pigment or dyes or other substances used to impart hue and chroma and value to an article.

As referred to herein, the term "conventional colorant" or "ordinary colorant" are used interchangeably herein and shall mean colorants which do not exhibit fluorescent properties.

As referred to herein, the term "dye" shall mean substances which impart color to a substrate by selective absorption of light. Dyes are soluble and/or go through an application process which, at least temporarily, destroys any crystal structure of the color substances. Dyes are retained in the substrate by absorption, solution, and mechanical retention, or by ionic or covalent chemical bonds.

As referred to herein, the term "fluorescent dye" shall mean a dye which absorbs light at a first wavelength and emits a second wavelength which is longer than the first wavelength.

Figure 4:
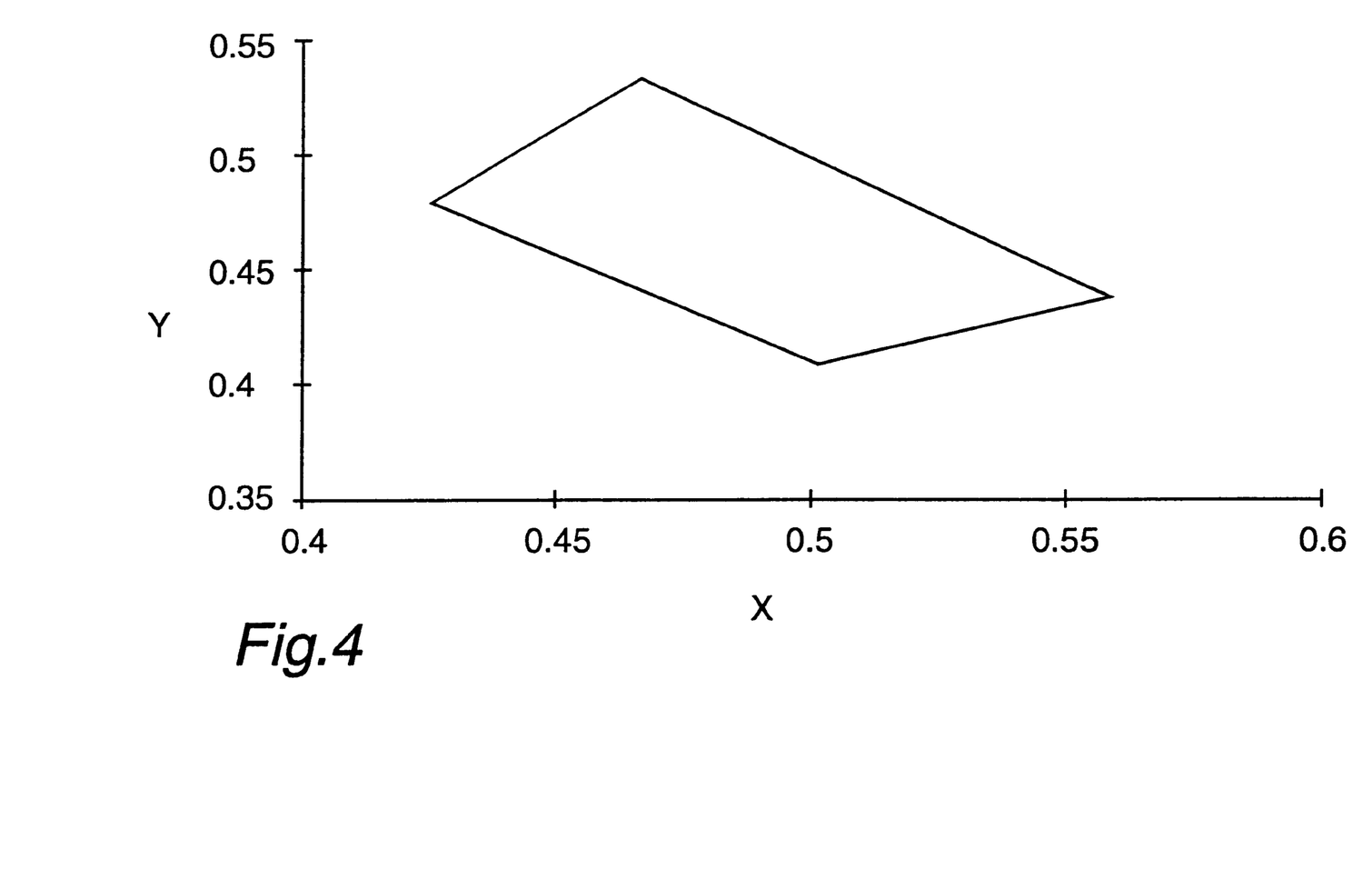
FIG. 4 is a CIE 1931 Chromaticity diagram defining the area of color space defined herein as yellow.

As referred to herein, the term "yellow" shall mean the color which is within the area defined by the four CIE chromaticity coordinates plotted and shown in FIG. 4 and in terms of the CIE 1931 Standard Colorimetric System and measured using 0/45 geometry and evaluated with CIE Standard Illuminant D65:

| x | y |
|---|---|
| .500 | .410 |
| .425 | .480 |
| .465 | .535 |
| .557 | .440 |

Preferably, the area is defined by chromaticity coordinates (x,y) (0.425, 0.480), (0.465, 0.535), (0.557, 0.440) and (0.500, 0.410); more preferably (0.425, 0.480), (0.465, 0.535), 0.532, 0.465) and (0.480, 0.430); and most preferably (0.440, 0.500), (0.465, 0.535), (0.532, 0.465) and (0.500, 0.443). The most preferred range defines highly saturated colors.

Fluorescence Luminance Factor ($Y_F$)

The luminance factor (CIE tristimulus value Y) is a standard measure of the amount of light (electromagnetic radiant power that is visually detectable by the normal human observer) radiating from a surface weighted by the eye's efficiency to convert the light to luminous sensation. It is defined as the ratio of the total luminance of a specimen to that of a perfect diffuser illuminated and viewed under the same conditions. For a fluorescent material, the luminance factor is the sum of two quantities, the reflected luminance factor ($Y_R$) and the fluorescence luminance factor ($Y_F$). The fluorescence luminance factor ($Y_F$) is the ratio of the fluorescent luminance (luminance due to emitted light) of the specimen to the luminance reflected by a perfect diffuser similarly illuminated and viewed. Under any specified conditions of illumination and viewing $Y=Y_R+Y_F$. It is the existence of fluorescent luminance ($Y_F>0$) which differentiates fluorescent color specimens from their non-fluorescent counterparts and other non-fluorescent high luminance colored materials. The fluorescence luminance factor ($Y_F$) measured under specified illumination and viewing conditions is a measure of a material's efficiency to convert absorbed electromagnetic radiant power into luminous sensation.

The invention is obtained by combining a fluorescent yellow-green dye with N,N'-distributed 3,4:9,10-perylenebis (dicarboximide) dye in a polymeric matrix in which the blend of dyes is soluble.

The perylene imide dye component of the fluorescent yellow article must not only be soluble in the polymeric matrix but should have a fluorescence luminance factor ($Y_F$) of greater than 5 in the polymeric matrix to ensure that the resulting blend with any soluble fluorescent yellow-green dye will have a $Y_F$ of greater than 5.

Such perylene imide dyes are, for example, a component of the formula

I wherein R is
—$C_{1-20}$ alkyl;
—$C_{3-20}$ cycloalkyl;

—$C_{1-20}$ alkyl substituted by one or more

- - OH
- - $OC_{1-6}$alkyl
- - - C—O—R1
     ‖  |
     O  R1
- - - C—N—R1
     ‖  |
     O  R1
- - O—C—N—R1
        ‖  |
        O  R1
- - N—C—R1
    |  ‖
    R1 O
- - - phenyl;

$(R2)_{0-5}$;

in which each R1 is independently H or $C_{1-20}$ alkyl and each R2 is independently $C_{1-20}$ alkyl, $C_{1-6}$ alkoxy or halo.

The term "alkyl" includes straight or branched chain having the above designated number of carbon atoms.

The term "alkoxy" includes straight or branched alkoxy having the above designated carbon atoms.

The term "halo" includes fluoro, chloro, bromo or iodo.

Preferred perylene imide dyes are those of formula I where R is 2-hydroxyethyl; n-pentyl; n-dodecyl; n-octadecyl; cyclododecyl; 2,3-dihydroxypropyl; propyl-2,3-dioctadecylcarbamate; 6-octadecylhexanoate; 6-octadecylhexanamide; 2-ethylphenyl; 2-isopropylphenyl; 2,6-diethylphenyl; 2,4,6-trimethylphenyl, and 2-methylpentane-5-N-(3,5,5-trimethylhexamide). More preferred are imide dyes of formula I where R is 2-ethylphenyl; 2-isopropylphenyl; 2,6-diethylphenyl; and 2,4,6-trimethylphenyl.

Any fluorescent yellow-green dye may be used in the present invention as long as it is soluble in the polymer matrix as a blend with the perylene imide dye. Suitable yellow-green dyes should have an excitation range within 400 to 500 nm, an absorption range within 380 to 450 nm, and an emission range within 450 to 550 nm. Thus, any of the above perylene imide dyes may be combined with at least one fluorescent yellow-green dye such as, for example, Lumogen F Yellow 083 available from BASF of Ludwigshafen, Germany; CI Solvent Yellow 98; CI Solvent Yellow 160:1; Oraset Yellow 8GF available from Ciba-Geigy of Basel, Switzerland; CI Solvent Green 4; CI Solvent Green 5; CI Pigment Yellow 101; Golden Yellow D-304 available from Day-Glo of Cleveland, Ohio; and CI Solvent Yellow 131.

The polymer matrix component of the present invention generally includes polycarbonates, polyurethanes, polyolefins, polyesters, polyvinyls, polyacrylates, and blends and copolymers thereof. Since the choice of polymer is dependent on the solubility of the dyes therein, we have found certain combinations of perylene imide dyes and polymer matrix to be best suitable. The following table and further description of particularly suitable matrices are illustrative.

TABLE

| Dye No. | R group in Formula I | Polymer with good solubility | Polymer with bad solubility |
|---|---|---|---|
| 1 | N,N'-bis(2-hydroxyethyl) | PC, PEST, PU | |
| 2 | N,N'-bis(n-pentyl) | PC, PEST, PO | |
| 3 | N,N'-bis(n-dodecyl) | PC, PO, PEST | |
| 4 | N,N'-bis(cyclododecyl) | PC, PEST | PO |
| 5 | N,N'-bis(2,3-dihydroxy-propyl) | PC, PEST | |
| 6 | N,N'-bis(propyl-2,3-dioctadecyl-carbamate) | PC, PEST | |
| 7 | N,N'-bis(6-octadecylhexanoate) | PC, PEST | PO |
| 8 | N,N'-bis(6-octadecylhexanamide) | PC, PEST | PO |
| 9 | N,N'-bis(2-ethylphenyl) | PC, PO, PEST | |
| 10 | N,N'-bis(2-isopropylphenyl) | PC, PO, PEST PU | |
| 11 | N,N'-bis(2,6-diethylphenyl) | PC, PEST | |
| 12 | N,N'-bis(2,4,6-trimethylphenyl) | PC, PU, PEST | |
| 13 | N,N'-bis(2-methylpentane-5-N-(3,5,5-trimethylhexamide) | PC, PEST | PU, PO |

PC . . . polycarbonate
PEST . . . polyester
PO . . . polyolefin
PU . . . polyurethane The following dyes were evaluated in the polymeric matrices indicated either alone or in combination with a fluorescent yellow-green dye.

Polyolefin Copolymers

The polyolefin copolymers may include, for example, poly(ethylene-co-acrylic acid)such as Primacor 3440 from Dow Chemical Company of Midland, Mich. and poly(ethylene-co-methacrylic acid) such as Nucrel 699 available from E.I. duPont Nemours of Wilmington, Del. in the present invention with at least one perylene imide and at least one yellow-green dye. An illustrative example of a perylene imide dye useful in polyolefin copolymers is Lumogen F240 available from BASF, believed to be N,N'-bis(2,6-di-isopropylphenyl)-3,4:9,10-perylenebis(dicarboximide).

Polycarbonate

Polycarbonate is a matrix which is useful in the invention Particularly useful are bisphenol A polycarbonates, such as FCR-2407 available from Bayer Corp. Perylene imide dyes such as Lumogen F240 available from BASF, believed to be N,N'-bis(2,6-di-isopropylphenyl)-3,4:9,10-perylenebis(dicarboximide), N,N'-bis(octadecyl)-3,4:9,10-perylenebis(dicarboximide), and N,N'-bis(phenethyl)-3,4:9,10-perylenebis(dicarboximide) are illustrative examples useful in polycarbonate matrices.

Polyesters

Polyester is a matrix which is useful in the invention. For example, polyethylene terephthalates are useful, as are copolyesters, for example Selar PT7001 and Selar PT8111 available from DuPont Co. Polyethylene naphthalate polyesters and their copolymers and blends, for example copolyesters of naphthalene dicarboxylic acid and isophthalic acid with polyols such as ethylene glycol or dimethanolcyclohexane, may also be used. Perylene imide dyes such as Lumogen F240 available from BASF, believed to be N,N'-bis(2,6-di-isopropylphenyl)-3,4:9,10-perylenebis(dicarboximide) and N,N'-bis(octadecyl)-3,4:9,10-perylenebis(dicarboximide) are useful in polyester matrices.

Polycarbonate/Polyester Blends

Polyester/polycarbonate alloys (blends) such as Eastalloy DA003 available from Eastman Chemical Company, Kingsport, Tenn. is a matrix which is useful in the invention. Perylene imide dyes such as Lumogen F240 available from BASF, believed to be N,N'-bis(2,6-di-isopropylphenyl)-3, 4:9,10-perylenebis(dicarboximide) and N,N'-bis(octadecyl)-3,4:9,10-perylenebis(dicarboximide) are useful in these polycarbonate blend matrices.

Polyacrylates

Polyacrylates such as polymethyl methacrylate are useful in the invention. Examples of polymethyl methacrylates which may be used are Plexiglas V045 and Plexiglas V825 available from Atohaas, Bristol Pa., Perspex CP924 available from ICI Acrylics, St. Louis, Mo., and Lucite 47K available from DuPont Co. Polyvinylidine fluoride polymers and blends with polymethyl methacrylates are also useful in the invention. Examples are Solef 1010 available from Solvay SA, Brussels and its blends with Plexiglas V045. Perylene imide dyes such as Lumogen F240 available from BASF, believed to be N,N'-bis(2,6-di-isopropylphenyl)-3,4:9,10-perylenebis(dicarboximide), and N,N'-bis(2,6-diethylphenyl)-3,4:9,10-perylenebis(dicarboximide) are useful in polyacrylate matrices.

Polyurethane

Aromatic and aliphatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether glycol, polycaprolactonediol, poly-1,2-butylene oxide glycol, and combinations of these polydiols, and (3) chain extenders such as butanediol and hexanediol are useful polymer matrices in the invention. Commercially available urethane polymers include: Morthane L424.167 and Morthane PN-03 from Morton International, Inc., of Seabroook, N.H. Perylene imide dye such as Lumogen F240 available from BASF, believed to be N,N'-bis(2,6-di-isopropylphenyl)-3,4:9,10-perylenebis(dicarboximide) is useful in such polyurethane matrices.

N,N'-Disubstituted 3,4:9,10-perylenebis(carboximide) dyes, e.g., those included in Formula I may be purchased from commercial sources, or may be prepared according to well known organic reaction schemes described in the art. Two standard procedures were used to prepare aliphatic substituted and aromatic substituted dyes. These are described in the Example section.

Dye Ratios and Loadings

The ratio of the yellow-green dye to perylene imide dye may vary over a wide range. In suitable proportions dye blends of the invention will provide a yellow fluorescent color within the chromaticity coordinates for yellow as defined above which encompass both the ASTM and CIE limits for visual signaling yellow. The range of yellow-green dye to perylene imide dye to obtain a fluorescent yellow is in the range from about 100 parts perylene imide dye to 1 part yellow-green dye by weight to about 10 parts perylene imide dye to 100 parts yellow-green dye. One skilled in the art will recognize that the actual ratio chosen will depend upon variables depending upon the intended final use of the invention. This includes the molecular weight and the absorption characteristics (such as molar absorptivity) of the specific dyes employed, and also includes product construction variables such as film thickness if a film is constructed. If the invention is used in retroreflective sheeting constructions the ratio of the yellow-green to perylene imide dye may also depend upon the use of backing layers used to achieve the retroreflection such as microspheres, cubes and the like which are described in more detail below.

Typically, between about 0.01 and about 2.00 weight percent, and preferably between about 0.05 and about 1.00 weight percent and most preferably between about 0.1 and 0.6 weight percent of the fluorescent dye blend is contained in the article of the present invention. It will be understood that articles with dye loadings outside this range can be used in accordance with the invention. Although dye loading may vary depending upon the final application, these loadings are typical for about a 0.075 to 0.25 mm thick film. Articles having heavier dye loadings will exhibit brighter fluorescence and/or deeper color than will articles with lighter dye loadings of the same dye. However, articles having very high fluorescent dye loadings may exhibit a self-quenching phenomenon which occurs when molecules of the fluorescent dye absorbs the energy emitted by neighboring fluorescent dye molecules. This self-quenching causes an undesirable decrease in fluorescent brightness.

Figure 1:
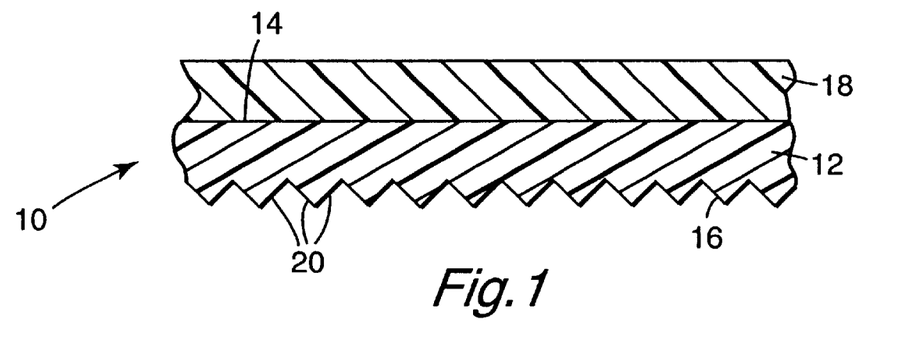
FIG. 1 is a cross-sectional illustration of a portion of one retroreflective embodiment of the invention.
Figure 2:
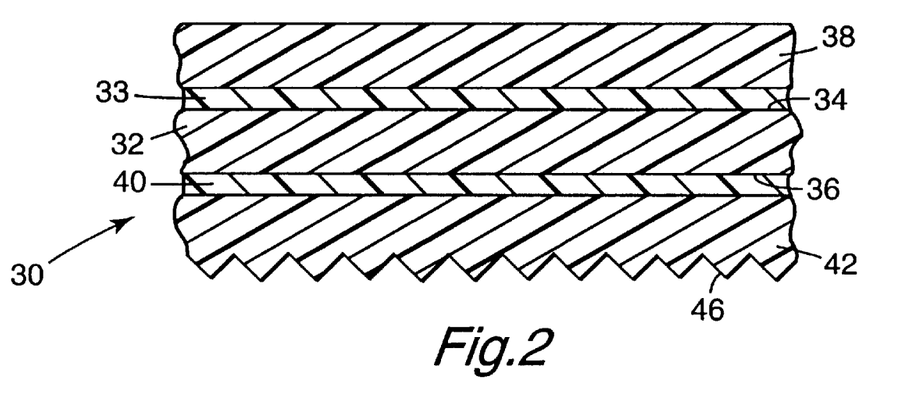
FIG. 2 is a cross-sectional illustration of a portion of another retroreflective embodiment of the invention.

In some embodiments the articles of the invention are films. In yet another embodiment, these films of the invention are retroreflective. Films of the invention without opacifying agents such as titanium oxide or calcium carbonate are transparent. Such capability may be achieved as shown in FIG. 1 by forming retroreflective elements 20 on second side 16 of color layer 12, or alternatively as shown in FIG. 2 by attaching retroreflective base sheet 42 to second 36 of color layer 32, either with transparent intermediate adhesive layer 40 as shown or by laminating the base sheet and color layer in direct contact with one another (not shown). As shown in FIG. 2, retroreflective base sheet 42 comprises a member with cube-corner retroreflective elements formed on back side 46 thereof. In other embodiments, the retroreflective base sheet may comprise a microsphere-based retroreflective structure, e.g., comprising a monolayer of transparent microspheres and reflective means disposed on the opposite side of the monolayer as the color layer. For instance, a screen layer/color layer combination of the invention may be laminated to the front surface of the cover film of an encapsulated-lens retroreflective sheeting such as is disclosed in U.S. Pat. No. 3,190,178 (McKenzie) or it may even be used as the cover of an encapsulated-lens sheeting. A screen layer is an overlay of clear polymer and may or may not include a UV-absorber and is optional in the present invention. In retroreflective embodiments, the color layer or at least that portion of it which is disposed in from the retroreflective elements, i.e., between the retroreflective elements and the screen layer, should be substantially transparent to visible light.

Figure 3:
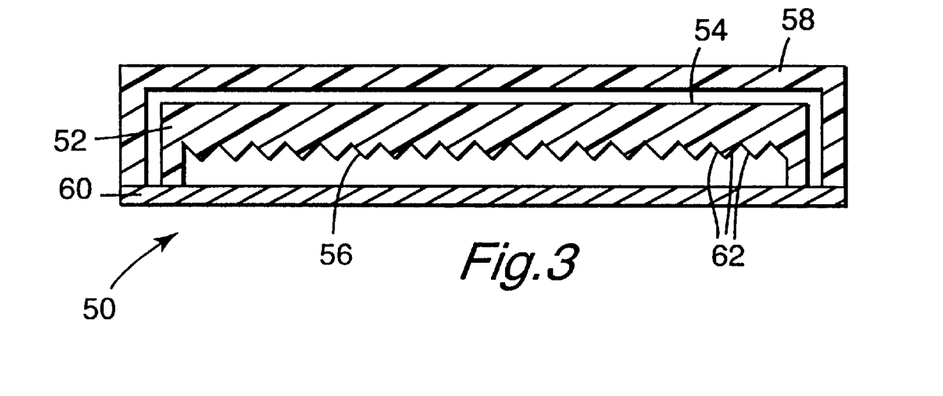
FIG. 3 is a cross-sectional illustration of another retroreflective embodiment of the invention.

FIG. 3 illustrates another retroreflective embodiment of the invention wherein the article of the invention is a "button-type" retroreflector. Article 50 comprises color layer 52 with first side 54 and second side 56, screen layer 58 disposed to first side 54, and base member 60, with screen layer 58 and base member 60 enclosing color layer 52. Second side 56 has retroreflective elements 62 formed therein. Screen layer 58 and color layer 52 can be disposed spaced apart from one another as shown, or alternatively may be placed in contact with one another. Article 50 can be mounted on a backing (not shown), e.g., a sign panel, such that first side 54 is presented for viewing and retroreflective effect, with screen layer 58.

If desired, articles of the invention may be made in substantially rigid or flexible form. For example, in some embodiments, the article may be sufficiently flexible to be wound about a mandrel having a diameter of about 1 centimeter.

EXAMPLES

The following abbreviations are used in the examples:

| Abbreviation (or No.)[1] | Meaning |
|---|---|
| O240 | Lumogen F240 - orange perlyene dye from BASF |
| YPPE | N,N'-bis(phenethyl)-3,4:9,10-perylenebis(dicarboximide) |
| YP18 | N,N'-bis(octadecyl)-3,4:9,10-perylenebis(dicarboximide) |
| 4 | N,N'-bis(cyclodecyl)-3,4:9,10-perylenebis-(dicarboximide) |
| 6 | N,N'-bis(propyl-2,3-dioctadecylcarbamate)-3,4:9,10-perylenebis(dicarboximide) |
| 13 | N,N'-bis[2-methylpentane-5-N-(3,5,5-trimethyl-hexamide)]-3,4:9,10-perylenebis(dicarboximide) |
| 12 | N,N'-bis(2,4,6-trimethylphenyl)-3,4:9,10-perylenebis-(dicarboximide) |
| 11 | N,N'-bis(2,6-diethylphenyl)-3,4:9,10-perylenebis-(dicarboximide) |
| 8 | N,N'-bis(6-octadecylhexanamide)-3,4:9,10-perylenebis-(dicarboximide) |
| 3 | N,N'-bis(n-docecyl)-3,4:9,10-perylenebis(dicarboximide) |
| 2 | N,N'-bis(n-pentyl)-3,4:9,10-perylenebis(dicarboximide) |
| 6961A | Chromophthal Red 6961A - perylene imide dye from Ciba-Geigy |
| L083 | Lumogen F Yellow 083 - perylene dye from BASF |
| SY98 | CI Solvent Yellow 98 - thioxanthene dye from Hoechst |
| SY160 | CI Solvent Yellow 160:1 - benzoxazolecoumarin dye from Bayer |
| O8GF | Oraset Yellow 8GF - methine dye from Ciba Geigy |
| SG4 | CI solvent Green 4 - xanthene dye from BASF |
| SG5 | CI solvent Green 5 - perylene dye from BASF |
| PY101 | CI Pigment Yellow 101 - azomethine dye from BASF |
| D304 | Golden Yellow D-304 - thioxanthene dye from Day-Glo Color |
| SY131 | CI Solvent Yellow 131 - naphthalimide dye from Day-Glo Color |
| PC | Bisphenol A polycarbonate |
| PO | Polyolefin copolymer |
| PMMA | Polymethylmethacrylate |
| PEST | Polyester |
| PC/PEST | Blend of polycarbonate and polyester |
| PUR | Polyurethane |
| PVDF/PMMA | Blend of polyvinylidine fluoride and polymethylmethacrylate |

[1]See Previous Table for Dye Structures

Color Measurement

Chromaticity coordinates (x,y) were determined in accordance with ASTM E991: Standard Practice for Color Measurement of Fluorescent Specimens using 0/45 illuminating/viewing geometry. While the CIE does not have a recommendation for an artificial source to realize CIE Standard Illuminant D65, ASTM E:991 describes methods to assess the adequacy of the D65 simulation. Determination of the source conformance factor (SCF) of the instrument is one of these methods. The source conformance factor of the simulation of CIE Illuminant D65 measured at the specimen port of the spectrophotometer used was 17.9 over the range from 300 to 700 nm, 35.9 over the range from 300 to 380 nm, and 9.2 over the range from 380 to 700 nm. The chromaticity coordinates were calculated for CIE Standard illuminant D65 and the CIE 1931 (2°) Standard Observer.

The color of free films were measured with the films mounted on 3M Scotchlite Brand Diamond Grade Brand VIP Reflective Sheeting White 3990, or a white ceramic tile having a spectral reflectance of approximately 80% over the range from 400 to 700 nm.

Fluorescence and Fluorescence Luminance Factor

The fluorescence luminance factor ($Y_F$) was determined using the following spectrophotometric instrumental method:

(1) The total luminance factor (Y) of the sample was measured in accordance with ASTM Practice E991 for CIE illuminant D65 calculating the value of Y for the CIE 1931 (220) standard observer.

(2) The reflected spectral radiance factors ($\beta_R$) of the sample over the wavelength range from 400 to 700 nm were determined using the method described in the paper "Separation of the spectral radiance factor curve of fluorescent specimens into reflected and fluoresced components" by Eugene Allen which was published in the journal *Applied Optics* (Vol. 12No. 2) on pages 289–293 (1973) Sharp cut-off long pass filters were used for the fluorescence-weakening and fluorescence-killing filters. The spectral transmittance characteristics of the filters were:

| Filter Identification/Description | Wavelength (nm) at the indicated % Transmittance | | |
|---|---|---|---|
| | 0% T | 5% T | 10% T |
| fluorescence-weakening | 490 | 505 | 507 |
| fluorescence-killing | 540 | 562 | 565 |

(3) The reflectance luminance factor ($Y_R$) of the sample was calculated for CIE illuminant D65 and the CIE 1931 (2°) standard observer from the reflected spectral radiance factors.

(4) The fluorescent luminance factor ($Y_F$) of the sample for CIE illuminant D65 and the CIE 1931 (2°) standard observer was calculated using the equation:

$$Y_F = Y - Y_R$$

Samples were also viewed under the natural daylight illumination to determine whether the samples appeared fluorescent to the naked eye. The samples were considered visibly fluorescent if they appeared to glow along a cut edge.

Example 1

Example 1 demonstrates embodiments of the invention in a polycarbonate matrix with a range of dye loadings.

Films were prepared for Example 1 as follows. The fluorescent dyes were blended with polycarbonate resin pellets at the weight percent loadings indicated in Table 1. The resin pellets used were Makrolon FCR-2407 available from Bayer Corporation of Pittsburgh, Pa. The dye/resin mixture was dried overnight to remove moisture. After drying overnight, the mixture was extruded into film of about 4 mils (0.1 mm) thick using a single screw extruder with three heating zones set at 260° C., 260° C. and 304° C. and a film die set at 304° C. The extruder was a ¾-inch single screw extruder for the Haake Rheocord as available from Haake of Karlsruhe, Germany.

For samples 1H, 1I and 1J, the film was then laminated onto 3M Scotchlite Brand Diamond Grade Brand LDP Retroreflective Sheeting 3970 construction as manufactured by 3M Company of St. Paul, Minn.

Samples 1A through 1G were prepared by hot laminating two 4 mil (0.10 mm) colored films together and by laminating a 2 mil (0.05 mm) clear PMMA overlay to a first surface of the resulting colored film. Retroreflective elements were embossed into the second surface of the colored film. The 2 mil (0.05 mm) overlay contained 1.8 wt % Tinuvin 327 from Ciba-Geigy Corp.

Color was determined for each sample as described above and results are shown in Table 1. The samples appeared visibly fluorescent along a cut edge.

TABLE 1

| Sample Number | Dye 1 | Dye 1 Weight % | Dye 2 | Dye 2 Weight % | Chromaticity Coordinates x | y | $Y_F$ |
|---|---|---|---|---|---|---|---|
| 1A | 0240 | 0.1 | SY98 | 0.1 | 0.515 | 0.478 | 50.0 |
| 1B | YPPE | 0.1 | SY98 | 0.1 | 0.525 | 0.468 | 41.9 |
| 1C | YP18 | 0.067 | SY98 | 0.1 | 0.517 | 0.475 | 43.6 |
| 1D | YP18 | 0.067 | SY98 | 0.12 | 0.506 | 0.486 | 49.8 |
| 1E | YP18 | 0.083 | SY98 | 0.12 | 0.514 | 0.478 | 45.7 |
| 1F | YP18 | 0.1 | SY98 | 0.12 | 0.522 | 0.470 | 41.7 |
| 1G | YP18 | 0.12 | SY98 | 0.12 | 0.526 | 0.466 | 34.9 |
| 1H | YP18 | 0.05 | SY98 | 0.09 | 0.457 | 0.496 | not measured |
| 1I | YP18 | 0.067 | SY98 | 0.12 | 0.473 | 0.497 | not measured |
| 1J | YP18 | 0.083 | SY98 | 0.15 | 0.483 | 0.496 | not measured |

Example 2

Example 2 demonstrates embodiments of the invention in a polymethacrylate matrix with a range of dye loadings.

The films for Example 2 were prepared as described in Example 1 except the polymeric matrix used was polymethyl methacrylate (PMMA) instead of polycarbonate. The PMMA used was either Perspex CP924 or (CP923 from ICI Acrylics (St. Louis, Mo.) or Lucite 47K from Dupont (Wilmington, Del.), all contained roughly 0.3 wt % UV absorber of a benzotriazole type. Films were made by either extrusion or solvent casting. Extrusion temperatures for the PMMA were 249° to 260° C. Solvent cast films were made by dissolving resin and dyes in a blend of tetrahydrofuran and methyl ethyl ketone and drying slowly at room temperature. The dyes and loadings used were as indicated in Table 2. Film samples were made by laminating the 4 mil (0.10 mm) colored films to a retroreflective sheeting sample (3M Scotchlite Brand Diamond Grade Brand LDP Sheeting 3970). The chromaticity coordinates of each sample were determined as described above and results are shown in Table 2. The samples appeared visibly fluorescent along a cut edge.

TABLE 2

| Sample Number | Dye 1 | Dye 1 Weight % | Dye 2 | Dye 2 Weight % | Chromaticity Coordinates x | y |
|---|---|---|---|---|---|---|
| 2A | 0240 | 0.20 | D304 | 0.02 | 0.504 | 0.471 |
| 2B | 0240 | 0.10 | PY101 | 0.10 | 0.487 | 0.498 |
| 2C | 0240 | 0.10 | SY160 | 0.10 | 0.508 | 0.480 |
| 2D | 0240 | 0.10 | SG4 | 0.10 | 0.496 | 0.457 |
| 2E | 0240 | 0.10 | SY98 | 0.25 | 0.508 | 0.474 |
| 2F | 0240 | 0.10 | D304 | 0.10 | 0.513 | 0.476 |

Example 3

Example 3 shows embodiments of the invention in a polyurethane matrix with a range of dye loadings.

The films for Example 3 were prepared as described in Example 1 except the polymeric matrix used was polyurethane (PUR) instead of polycarbonate. The PUR used was Morthane L424.167 from Morton International Inc., Seabrook, N.H. The dyes and loadings used are as indicated in Table 3. Extrusion conditions for the PUR were 154°–199° C. Retroreflective sheeting samples were made by laminating 4 mil (0.10 mm) colored films to 3M Scotchlite Brand Diamond Grade Brand LDP Reflective Sheeting 3970. Color measurements were made on each laminated sample and on the free films which were measured backed up with a white ceramic tile.

TABLE 3

| Sample Number | Dye 1 | Dye 1 Weight % | Dye 2 | Dye 2 Weight % | Laminated Construction Chromaticity Coordinates x | y | Free Film Chromaticity Coordinates x | y | $Y_F$ |
|---|---|---|---|---|---|---|---|---|---|
| 3A | 0240 | 0.10 | SY98 | 0.10 | 0.495 | 0.471 | 0.484 | 0.440 | 18.3 |
| 3B | 0240 | 0.08 | SY98 | 0.12 | 0.505 | 0.477 | 0.483 | 0.446 | 28.1 |
| 3C | 0240 | 0.07 | SY98 | 0.13 | 0.510 | 0.464 | 0.481 | 0.424 | 17.3 |

Example 4

Example 4 demonstrates embodiments of the invention in a polycarbonate/polyester blend matrix with a range of dye loadings.

The films for Example 4 were prepared as detailed in Example 1 except the polymeric matrix used was polycarbonate/polyester blend (PC/PEST) instead of polycarbonate. The PC/PEST used was Eastalloy DA003 from Eastman Chemical Company, Kingsport, Tenn. Extrusion conditions were 270–290 C. The dyes and their loading used are as indicated in Table 4.

Retroreflective sheeting samples were made by laminating 4 mil (0.10 mm) colored films to 3M Scotchlite Brand Diamond Grade Brand LDP Reflective Sheeting 3970. Color measurements were made on each laminated sample and on the free films which were measured backed up with a white ceramic tile.

TABLE 4

| Sample Number | Dye 1 | Weight % | Dye 2 | Weight % | Laminated Construction Chromaticity Coordinates x | y | Free Film Chromaticity Coordinates x | y | $Y_F$ |
|---|---|---|---|---|---|---|---|---|---|
| 4A | YP18 | 0.10 | SY98 | 0.10 | 0.498 | 0.480 | 0.446 | 0.434 | 22.2 |
| 4B | YP18 | 0.07 | SY98 | 0.12 | 0.490 | 0.493 | 0.475 | 0.472 | 22.9 |
| 4C | YP18 | 0.05 | SY98 | 0.15 | 0.476 | 0.501 | 0.466 | 0.478 | 20.4 |
| 4D | YP18 | 0.15 | SY98 | 0.05 | 0.506 | 0.465 | 0.481 | 0.425 | 20.6 |

Example 5

Example 5 demonstrates embodiments of the invention in a polyolefin copolymer matrix.

The films for Example 5 were prepared as outlined in Example 1 except the polymeric matrix used was poly (ethylene-co-acrylic acid) (EAA) instead of polycarbonate. The EAA used was Primacor 3440 from Dow Chemical Company, Midland, Mich. Extrusion conditions for the EAA were 175–215° C. The dyes and loadings used were as indicated in Table 5.

Retroreflective sheeting samples were made by laminating 4 mil (0.10 mm) colored films to 3M Scotchlite Brand Diamond Grade Brand LDP Reflective Sheeting 3970. Color measurements were made on each laminated sample and on the free films which were measured backed up with a white ceramic tile.

TABLE 5

| Sample Number | Dye 1 | Weight % | Dye 2 | Weight % | Laminated Construction Chromaticity Coordinates x | y | Free Film Chromaticity Coordinates x | y | $Y_F$ |
|---|---|---|---|---|---|---|---|---|---|
| 5A | 0240 | 0.10 | SY98 | 0.10 | 0.460 | 0.475 | 0.433 | 0.420 | 17.5 |
| 5B | 0240 | 0.10 | PY101 | 0.10 | 0.510 | 0.461 | 0.464 | 0.445 | 16.2 |

Example 6

Example 6 demonstrates embodiments of the invention in a polycarbonate matrix with a range of dye loadings.

Films were prepared for Example 6 as follows. The fluorescent dyes were blended with polycarbonate resin pellets at the weight percent loadings indicated in Table 6. The resin pellets used were Makrolon FCR-2407 available from Bayer Corporation of Pittsburgh, Pa. The dye/resin mixture was dried overnight to remove moisture. After drying overnight, the mixture was extruded into film of about 4 mils (0.1 mm) thick using a single screw extruder with three heating zones set at 260° C., 260° C., and 304° C. and a film die set at 304° C. The extruder war a ¾-inch single screw extruder for the Haake Rheocord as available from Haake of Karlsruhe, Germany.

Samples were prepared by hot laminating two 4 mil (0.10 mm) colored films together and laminating a 2 mil (0.05 mm) clear PMMA overlay to a first surface of the resulting colored film. Retroreflective elements were embossed into the second surface of the colored film. The 2 mil (0.05 mm) overlay contained 1.8 wt % Tinuvin 327 from Ciba-Geigy Corp.

Color was determined for each sample as described above and results are shown in Table 6. Fluorescence testing was also undertaken for each sample and was observed in each sample.

TABLE 6

| Sample Number | Dye 1 | Weight % | Dye 2 | Weight % | Chromaticity Coordinates x | y | $Y_F$ |
|---|---|---|---|---|---|---|---|
| 6A | 6961A | 0.05 | SY98 | 0.15 | 0.485 | 0.503 | 59.6 |
| 6B | 6961A | 0.10 | SY98 | 0.10 | 0.501 | 0.488 | 57.3 |
| 6C | 6961A | 0.12 | SY98 | 0.12 | 0.510 | 0.482 | 54.9 |

Example 7

The following films were prepared and tested to measure the fluorescence luminance factor ($Y_F$) as well as the chromaticity of various perylene imide dyes in various polymer matrices without the presence of a fluorescent yellow green dye. The films were made by extrusion of each polymer as described in Examples 1–6. The color of the films was measured with the films mounted on 3M Scotchlite Brand Diamond Grade Brand VIP Reflective Sheeting White 3990. Table 7 shows the results.

TABLE 7

| Dye ID | Wt % Dye | Polymer ID | $Y_F$ | x | y |
|---|---|---|---|---|---|
| Dye 5 | 0.2 | PC (FCR-2407) | 26.5 | 0.540 | 0.433 |
| Dye 6 | 0.2 | PC (FCR-2407) | 28.8 | 0.470 | 0.424 |
| Dye 8 | 0.2 | PC (FCR-2407) | 20.8 | 0.491 | 0.406 |
| Dye 11 | 0.1 | PC (FCR-2407) | 38.0 | 0.484 | 0.454 |
| Dye 11 | 0.3 | PC (FCR-2407) | 36.1 | 0.517 | 0.464 |
| Dye 12 | 0.1 | PC (FCR-2407) | 38.3 | 0.481 | 0.456 |
| Dye 12 | 0.3 | PC (FCR-2407) | 34.9 | 0.518 | 0.464 |
| Dye 13 | 0.2 | PC (FCR-2407) | 22.8 | 0.542 | 0.424 |
| YP18 | 0.2 | PC (FCR-2407) | 31.2 | 0.534 | 0.441 |
| YPPE | 0.2 | PC (FCR-2407) | 34.1 | 0.528 | 0.442 |
| Dye 2 | 0.1 | PO (Primacor 3440) | 10.5 | 0.498 | 0.384 |

TABLE 7-continued

| Dye ID | Wt % Dye | Polymer ID | $Y_F$ | x | y |
|---|---|---|---|---|---|
| Dye 3 | 0.01 | PO (Primacor 3440) | 15.1 | 0.369 | 0.371 |
| Dye 3 | 0.1 | PO (Primacor 3440) | 9.2 | 0.449 | 0.367 |
| Dye 4 | 0.2 | PO (Primacor 3440) | 4.3 | 0.504 | 0.343 |
| Dye 8 | 0.2 | PO (Primacor 3440) | 5.4 | 0.411 | 0.347 |
| Dye 11 | 0.01 | PO (Primacor 3440) | 17.6 | 0.357 | 0.382 |
| Dye 11 | 0.1 | PO (Primacor 3440) | 26.0 | 0.445 | 0.417 |
| Dye 12 | 0.01 | PO (Primacor 3440) | 9.1 | 0.345 | 0.355 |
| Dye 12 | 0.1 | PO (Primacor 3440) | 21.5 | 0.453 | 0.412 |
| Dye 12 | 0.3 | PO (Primacor 3440) | 11.1 | 0.491 | 0.388 |
| Dye 13 | 0.2 | PO (Primacor 3440) | 2.9 | 0.449 | 0.346 |
| O240 | 0.1 | PO (Primacor 3440) | 34.5 | 0.445 | 0.442 |
| O240 | 0.3 | PO (Primacor 3440) | 33.5 | 0.492 | 0.436 |
| YPPE | 0.2 | PO (Primacor 3440) | 4.0 | 0.336 | 0.383 |
| YP18 | 0.2 | PEST (CHMD CoPEN)[a] | 35.8 | 0.527 | 0.404 |
| O240 | 0.2 | PEST (Selar PT 7001) | 45.6 | 0.527 | 0.440 |
| YP18 | 0.2 | PEST (Selar PT 7001) | 34.8 | 0.538 | 0.431 |
| O240 | 0.2 | PEST (Selar PT 8111) | 43.3 | 0.524 | 0.432 |
| YP18 | 0.2 | PEST (Selar PT 8111) | 34.9 | 0.535 | 0.429 |
| O240 | 0.2 | PMMA/PVDF[b] | 37.6 | 0.497 | 0.449 |
| YP18 | 0.2 | PMMA/PVDF[b] | 6.4 | 0.548 | 0.365 |
| Dye 3 | 0.1 | PMMA (Plexiglas V825) | 35.7 | 0.484 | 0.441 |
| Dye 12 | 0.1 | PMMA (Plexiglas V825) | 48.5 | 0.477 | 0.466 |
| Dye 12 | 0.3 | PMMA (Plexiglas V825) | 44.6 | 0.516 | 0.465 |
| Dye 11 | 0.1 | PMMA (Plexiglas V825) | 49.6 | 0.492 | 0.466 |
| Dye 11 | 0.3 | PMMA (Plexiglas V825) | 42.9 | 0.527 | 0.466 |
| O240 | 0.2 | PMMA (Plexiglas V045) | 50.4 | 0.498 | 0.466 |
| Dye 4 | 0.2 | PMMA (Pexiglas V045) | 19.5 | 0.563 | 0.417 |
| O240 | 0.2 | PMMA (Perspex CP-924) | 54.6 | 0.493 | 0.464 |
| YP18 | 0.06 | PMMA (Perspex CP-924) | 19.2 | 0.372 | 0.389 |
| O240 | 0.25 | PUR (Morthane L424.167) | 38.0 | 0.513 | 0.447 |
| O240 | 0.2 | PUR (Morthane PNO3) | 37.8 | 0.526 | 0.423 |

[a]Copolyester of 50 mole percent naphthalene dicarboxylic acid, 30 mole percent of ethylene glycol, and 20 mole percent of cyclohexanedimethanol (CHMD);
[b]60/40 blend by weight of Solef 1010 and Plexiglas VO45.

Example 8

Aliphatic Dyes

The following procedure for preparing fluorescent Dye YP18 was the standard method used for preparing all aliphatic substituted dyes.

A three-liter three-neck round bottom flask was equipped with a mechanical stirrer and cold water condenser and electric heating mantle. To the flask was added 157 g. (0.40 mole) 3,4:9,10-perylene tetracarboxylic anhydride, 210 g. (0.78 mole) octadecylamine, and 1500 g. DMF. Agitated the reaction at high speed. Heated the mixture at a moderate rate to a batch temperature of 140° C. Excessive application of heat to the batch may result in foaming of the reactants. If foaming was noted, reduced the heat until the foaming subsided, and then applied it more gradually. Once the reaction temperature reached 140° C., held the batch with good agitation for five hours. At this point, sampled the batch and used IR to determine the % residual anhydride. Once the reaction was complete, cooled the batch to 15° C. and filtered to collect the red solid product. Added 1000 g. water to the reaction flask and heated to 80° C., then used this to thoroughly wash the cake. Dried the product in a vacuum oven at 110° C. and full vacuum, to yield 330 g. (92%) of orange-red powder.

Similar procedures were used to prepare the following aliphatic dyes, with the following changes; the dye numbers refer to the dyes in Table I:

For Dye 1, an equivalent molar amount of ethanolamine was used instead of octadecylamine.

For Dye 2, an equivalent molar amount of amylamine was used instead of octadecylamine.

For Dye 3, an equivalent molar amount of dodecylamine was used instead of octadecylamine.

For Dye 4, an equivalent molar amount of cyclododecylamine was used instead of octadecylamine.

For Dye 5, an equivalent molar amount of 3-amino-1,2-propane diol was used instead of octadecylamine.

Example 9

Preparation for Dye 6

A 500 ml. three-neck round bottom flask was equipped with a mechanical stirrer and condenser. Added 5.4 g. (0.01 mole) of Dye 5, 11.8 g. (0.04 mole) of octadecylamine, 1 drop dibutyltin dilaurate, and 200 g. xylenes. Heated the mixture to reflux for a total of 29 hours. IR showed little residual isocyanate. Cooled to room temperature and filtered off the solid. Recrystallized from boiling DMF to obtain the product, a dark red-purple solid.

Example 10

Preparation for Dye 7

A one-liter three-neck round-bottom flask was equipped with a mechanical stirrer and cold water condenser and electric heating mantle. To the flask added 39.2 g. (0.10 mole) 3,4:9,10-perylene tetracarboxylic anhydride, 27.5 g. (0.21 mole) 5-aminocaproic acid, and 500 g. N-methyl pyrrolidone. Agitated the reaction at high speed. Heated the mixture at a moderate rate to a batch temperature of 200° C., held the batch there with good agitation for five hours. Cooled the batch to room temperature and filtered to collect the red solid product. Added 500 g. water to the reaction flask and heated to 80° C., then used this to thoroughly wash the cake. Dried the product in a vacuum oven at 110° C. and full vacuum, to yield 43.5 g. (70%) of orange-red powder (intermediate 1).

12.4 g. (0.02 mole) of the above intermediate was mixed with 75 g. (0.28 mole) of octadecanol and 1.0 g. para toluene sulfonic acid in a three-neck round-bottom flask equipped with a mechanical stirrer and dean-stark trap/condenser. Heated to 120° C. for 18 hours. Cooled to room temperature and added 400 g. methyl ethyl ketone. Heated to reflux for one hour, then cooled and filtered the solid product on a buchner funnel. Washed with additional warm MEK, then oven-dried to collect 15.8 g. of the deep red colored product.

Example 11

Preparation for Dye 8

12.4 g. (0.02 mole) of intermediate 1 (from Example 10) was mixed with 25 g. (0.093 mole) octadecylamine and 75 ml. diglyme in a 100 ml round-bottom flask. Heated to 150° C. and held for 18 hours. Cooled to room temperature, added 400 g. water and filtered. Took the solid into 400 g. MEK and heated to reflux, then cooled and filtered and dried to yield 20.3 g. of the dark red product.

Example 12

Preparation for Dye 13

A 500 ml. three-neck round-bottom flask was equipped with a mechanical stirrer, dean-stark trap/cold water condenser and electric heating mantle. Added 116 g. (1.0 mole) 2-methyl-1,5-diaminopentane and 79 g. (0.5 mole) 3,5,5-trimethylhexanoic acid. Heated to 150–160° C. and followed the reaction by GC (gas chromatography); after five hours distilled the mixture using a Vigeraux column and vacuum pump. Collected the product (intermediate 2) at a head temperature of 150–160° C. and vacuum of 0.25 mm Hg.

A 500 ml. three-neck round-bottom flask was equipped with a mechanical stirred and cold water condenser and electric heating mantle. To the flask added 11.7 g. (0.03 mole) 3,4:9,10-perylene tetracarboxylic anhydride, 15.0 g. (0.06 mole) intermediate 2, and 200 g. DMF. Agitated the reaction at high speed. Heated the mixture at a moderate rate to reflux temperature; held the batch there with good agitation for twenty hours. Cooled the batch to room temperature and filtered to collect the red solid product. Added 500 g. water to the reaction flask and heated to 80° C., then used this to thoroughly wash the cake. Dried the product in a vacuum oven at 110° C., to yield 20.8 g. (80%) of red powder.

Example 13

The following procedure was used for the synthesis of Dye 10, and was the general procedure used to prepare aromatic substituted dyes.

A one-liter three-neck round-bottom flask was equipped with a mechanical stirrer, dean-stark trap/cold water condenser, nitrogen purge, temperature probe, and electric heating mantle. To the flask added 50 g. (0.127 mole)3,4:9, 10-perylene tetracarboxylic anhydride, 68.9 g. (0.51 mole) 2-isopropyl aniline, 17.7 g. (0.09 mole) zinc acetate and 500 g. quinoline. Agitated the reaction at high speed. Heated the mixture at a moderate rate to a batch temperature of 240° C., using a slight nitrogen stream. Held the batch at this temperature for four hours. Cooled the batch to 70° C. and added 400 g. methanol and stirred well. Filtered to collect the red solid product. Put the solid back into the flask with 600 g. methanol and stirred for one hour at room temperature. Filtered to collect the solid. Put the solid back into the flask with 700 g. water and 100 g. sodium carbonate and heated to 80° C. Held for two hours, then filtered onto a buchner and washed well with additional water. Dried the product in a vacuum oven at 110° C. and full vacuum, to yield 69 g. (86%) of red powder.

Dye 9 was prepared in a similar fashion, but used an equivalent molar amount of 2-ethyl aniline instead of 2-isopropyl aniline.

Dye 11 was prepared in a similar fashion, but used an equivalent molar amount of 2,6-diethyl aniline instead of 2-isopropyl aniline.

Dye 12 was prepared in a similar fashion, but used an equivalent molar amount of 2,4,6-trimethyl aniline instead of 2-isopropyl aniline.

We claim:

1. A fluorescent yellow article comprising:

(a) a polymeric matrix;

(b) an N,N'-disubstituted 3,4:9,10-perylenebis (dicarboximide) dye of the formula wherein R is
    —$C_{1-20}$ alkyl;
    —$C_{3-20}$ cycloalkyl;
    —$C_{1-20}$ alkyl substituted by one or more in which each R1 is independently H or $C_{1-20}$ alkyl and each R2 is independently $C_{1-20}$ alkyl, $C_{1-6}$ alkoxy or halo; and (c) a fluorescent yellow-green dye, wherein:
        (i) the dyes are soluble in the polymeric matrix, and
        (ii) the article has chromaticity coordinates (x,y) within the area defined by (0.425, 0.480), (0.465, 0.535), (0.557, 0.440) and (0.500, 0.410) in terms of the CIE 1931 Standard Colorimetric System and measured using 0/45 geometry and evaluated with CIE Standard Illuminant D65 and a fluorescence luminance factor of greater than 5.

2. The article of claim 1, wherein the polymeric matrix comprises a polyolefin copolymer, a polycarbonate, a polyester, a polymer alloy, a polyacrylate, a polymethacrylate, a polyurethane, a polyvinylchloride, or a mixture thereof.

3. The article of claim 1, wherein the polymeric matrix comprises a polycarbonate.

4. The article of claim 1, wherein the polymeric matrix comprises a polyester.

5. The article of claim 2, wherein the polyacrylate is polymethylmethacrylate.

6. The article of claim 2, wherein the polymer alloy is a blend of polyester/polycarbonate or polymethylmethacrylate/polyvinylidene difluoride.

7. The article of claim 1, wherein R is selected from the group consisting of 2-hydroxyethyl, n-pentyl, n-dodecyl, n-octadecyl, cyclododecyl, 2,3-dihydroxypropyl, propyl-2, 3-dioctadecylcarbamate, 6-octadecylhexanoate, 6-octadecylhexanamide, 2-ethylphenyl, 2-isopropylphenyl, 2,6-diethylphenyl, 2,4,6-trimethylphenyl, and 2-methylpentane-5-N-(3,5,5-trimethylhexamide).

8. A fluorescent retroreflective article comprising at color dye having first and second sides,
    wherein said article comprises retroreflective elements on one side of said color layer or a retroreflective base sheet disposed on one side of said color layer, wherein said color layer comprises the yellow article of claim 1.

9. A method of manufacturing a fluorescent yellow article comprising the steps of:
  (a) blending an N,N'-disubstituted 3,4:9,10-perylenebis-(dicarboximide) dye and a fluorescent yellow-green dye in a polymeric matrix to form a solid solution, and
  (b) extruding said solution to form a film, wherein the resulting film has chromaticity coordinates (x,y) within the area defined by (0.425, 0.480), (0.465, 0.535), (0.557, 0.440) and (0.500, 0.410) in terms of the CIE 1931 Standard Colorimetric System and measured using 0/45 geometry and evaluated with CIE Standard Illuminant D65 and a fluorescence luminance factor of greater than 5; wherein said perylenebis (dicarboximide) dye is of the formula:

wherein R is
—$C_{1-20}$ alkyl;
—$C_{3-20}$ cycloalkyl;
—$C_{1-20}$ alkyl substituted by one or more

- -OH
- -$OC_{1-6}$alkyl
- -C(=O)-O-R1
- -C(=O)-N(R1)-R1
- -O-C(=O)-N(R1)-R1
- -N(R1)-C(=O)-R1
- -phenyl;

in which each R1 is independently H or $C_{1-20}$ alkyl and each R2 is independently $C_{1-20}$ alkyl, $C_{1-6}$ alkoxy or halo.

* * * * *

UNITED STATES PATENT AND TRADEMARK OFFICE
CERTIFICATE OF CORRECTION

PATENT NO.: 5,920,429

DATED: July 6, 1999

INVENTOR(S): David M. Burns, David B. Olson and Lee A. Pavelka

It is certified that error appears in the above-identified patent and that said Letters Patent is hereby corrected as shown below:

Column 18, Line 63: Delete the phrase "comprising at color dye" and insert in place thereof -- comprising a color dye --.

Signed and Sealed this

Eighth Day of May, 2001

Attest:

NICHOLAS P. GODICI

Attesting Officer     Acting Director of the United States Patent and Trademark Office